United States Patent [19]
Ha et al.

[11] Patent Number: 5,869,945
[45] Date of Patent: Feb. 9, 1999

[54] INFRARED SCANNER

[75] Inventors: Humphrey Wing-Hong Ha; Mark A. Gohlke, both of Plano; Mark G. Webb, Dallas; Keith R. Kuemmerle, Richardson; Michael R. Thering, Rowlett; Steven Jenkins; Gary R. Herrington, both of Plano, all of Tex.

[73] Assignee: Raytheon TI Systems, Inc., Lewisville, Tex.

[21] Appl. No.: 781,706

[22] Filed: Jan. 10, 1997

[51] Int. Cl.⁶ .................................................. G05B 1/00
[52] U.S. Cl. .................. 318/600; 318/577; 340/347 XY; 250/202; 358/75
[58] Field of Search ..................................... 318/560–696; 128/664, 665; 348/218, 335, 219; 360/73.12, 77.13, 31, 77.14, 77.15

[56] References Cited

U.S. PATENT DOCUMENTS

| | | | |
|---|---|---|---|
| 3,646,547 | 2/1972 | Hoffmann | 340/347 XY |
| 3,743,427 | 7/1973 | Weiser | 356/124 |
| 3,864,689 | 2/1975 | Young | 343/854 |
| 4,232,345 | 11/1980 | Zollman et al. | 358/299 |
| 4,371,782 | 2/1983 | Brouwer | 250/202 |
| 4,385,521 | 5/1983 | Hagen et al. | 73/619 |
| 4,453,084 | 6/1984 | Brouwer | 250/202 |
| 4,453,827 | 6/1984 | Taboada | 356/353 |
| 4,486,654 | 12/1984 | Brouwer | 250/202 |
| 4,499,489 | 2/1985 | Gall et al. | 358/75 |
| 4,553,478 | 11/1985 | Greiner et al. | 101/426 |
| 4,579,122 | 4/1986 | Shimizu et al. | 128/660 |
| 5,228,070 | 7/1993 | Mattson | 378/19 |

Primary Examiner—Paul Ip
Attorney, Agent, or Firm—Baker & Botts, L.L.P.

[57] ABSTRACT

A scanner which includes a motor for driving a load and circuitry for providing a position error signal responsive to the difference between a predicted position of the load and the actual position of the load, preferably a mirror scanning a scene. The motor is driven in response to the position error signal. The position error signal is provided plural times during a single scanning of the scene. The circuitry for providing a position error signal includes a closed loop filter system for filtering the error signal to provide a filtered error signal, an adaptive filter system for operating on the filtered error signal to provide an adaptively filtered error signal and summing circuitry for summing signals indicative of the predicted position, the filtered error signal and the adaptively filtered error signal. The closed loop filter system includes, in series, at least one first order lead lag filter and a double integral plus proportional filter. The adaptive filter system includes, in series, a low pass filter, a register and an integrator.

31 Claims, 1 Drawing Sheet

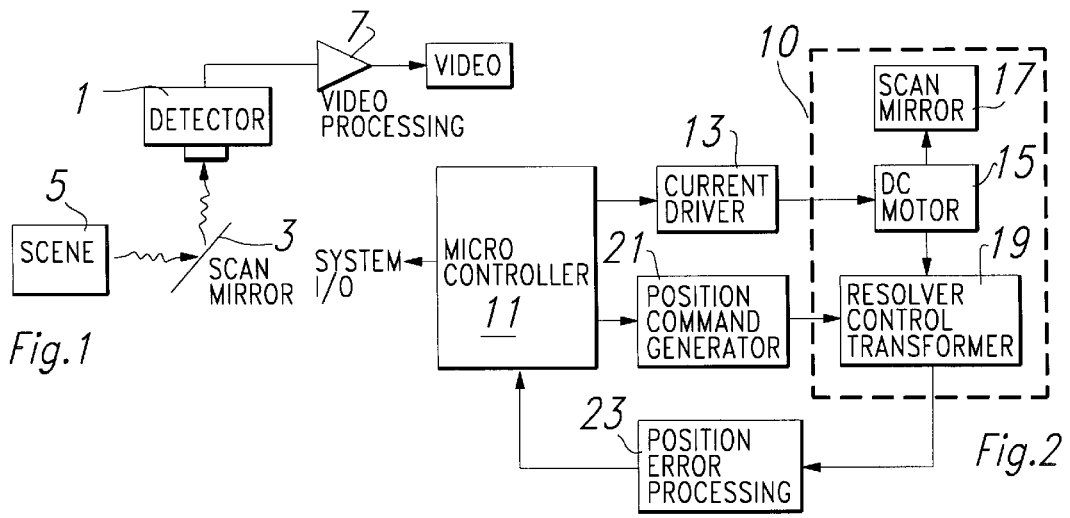
Fig.1
Fig.2
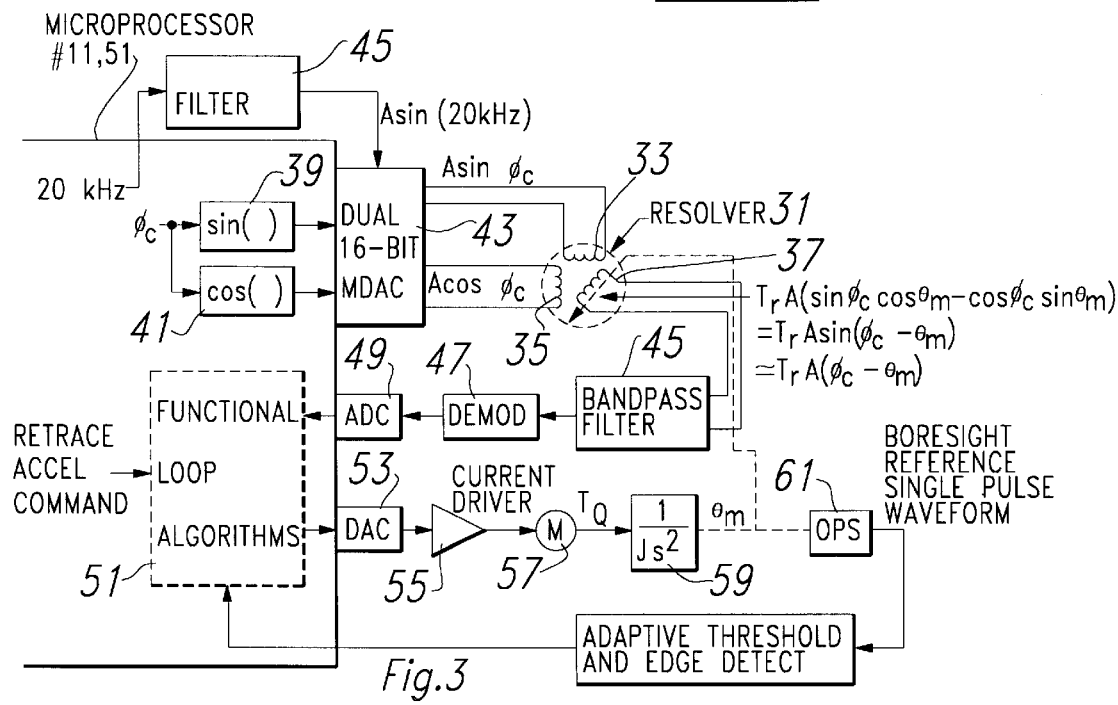
Fig.3
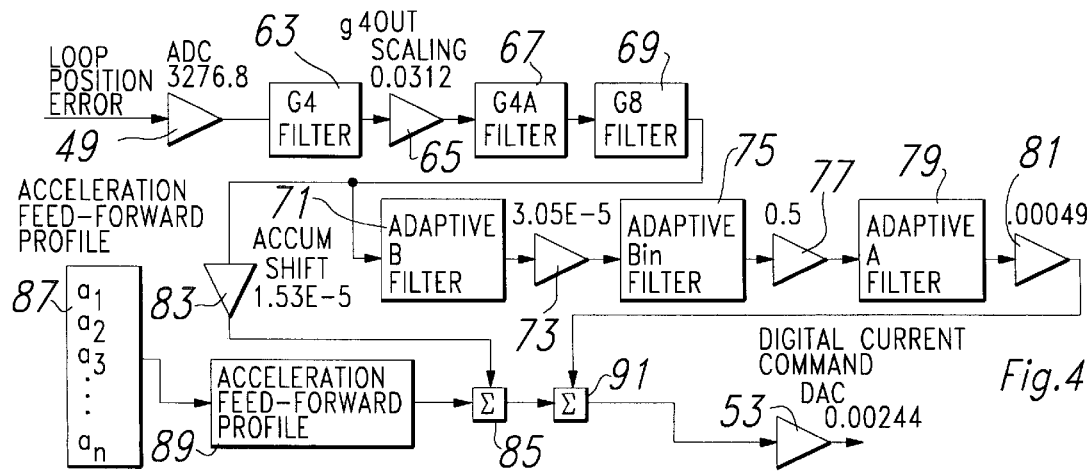
Fig.4

INFRARED SCANNER

This application claims priority under 35 USC § 119 (e)(1) of provisional application number 60/011,204, filed Feb. 6, 1996.

BACKGROUND OF THE INVENTION

1. Field of the Invention

This invention relates to infrared (IR) scanners and, more specifically, to oscillating type IR scanners.

2. Brief Description of the Prior Art

The purpose of a scanner of the type discussed hereinbelow is to sweep in azimuth a two-dimensional infrared scene across a one-dimensional array of detectors, thus creating a two-dimensional image of the scanned scene with the infrared scanning system. This is accomplished by precisely controlling the position of a mirror which scans the scene in synchronization with the sampling of the detector. Conversely, this process may be viewed as sweeping the column of detectors across the field of view. Some scanners can also hold a static position (i.e., not scanning). An interlacer can be provided which moves in elevation in the cross-scan axis up and down one half of a detector pixel distance to scan between the prior positions of adjacent detector elements and increase the vertical resolution of the system.

The main performance attributes of an IR scanner are linearity, repeatability and efficiency. Historically, polygon scanners have had a greater advantage over the oscillating scanners in terms of linearity and repeatability performance. However, the low scan efficiency plus added power, weight and size of a polygon scanner renders it unsuitable for deployment in some systems.

Prior art galvanometer based scanners have been incapable of providing the linearity and repeatability required for focal plane array (FPA) base imaging systems.

SUMMARY OF THE INVENTION

In accordance with the present invention, there is provided an IR scanner of the oscillating type that provides high quality IR images for target acquisition, display and tracking purposes in a FPA based IR imaging system. The system in accordance with the present invention has the advantage over the polygon and the galvanometer based scanners of reduced size, weight and power requirements and improved performance.

A DC motor is used to drive the mirror of the scanner in the scanning direction with retrace at the end of the scan. The feedback from the DC motor is a resolver (sensor) which is used in a new way from that of prior art scanners. A major difference as compared with prior art scanners is that the position that is entered into the resolver is the position to which the mirror is to scan at each of plural points along the scanning path with an error signal being provided by the resolver as opposed to entry of the present position of the mirror from the resolver with operation thereon as provided in the prior art. In the prior art, the resolver provides the sine and cosine data of the present angle of the mirror whereas, in accordance with the present invention, the sine and cosine data of the desired angle for each of the plural points along the scan path of the mirror is entered into or provided to the resolver with the resolver then providing an error signal indicative of the difference between the desired angle of the mirror and the present angle of the mirror. Accordingly, the output of the resolver is an error signal which is indicative of the difference between the present position of the mirror and the desired position of the mirror at that point in time. The control loop then controls the mirror and drives this error to zero via the DC motor. This difference provides several advantages for the accuracy of the scanner in terms of temperature and component tolerances. Measurement of the error as opposed to the actual angle of the mirror improves the resolution of the system significantly because the angles being measured are large compared to the error signal which is generally small, thereby decreasing the required measured dynamic range.

Another novel feature is the adaptive control of the system in addition to and in conjunction with the closed loop control which gradually drives the system error toward zero.

Briefly, the motor controlling the scanning mirror is initially driven by a current driver which is controlled by a [combination] signal which is [the sum of] a preprogrammed acceleration profile, this signal being a predicted, fixed and stored profile designed to move the mirror exactly in synchronism with the array of detectors. A resolver receives signals (e.g. sine and cosine signals) indicative of the desired position of the mirror and motor at plural points in time during a scan, compares these signals with the actual position of the motor and mirror and provides an error signal. This error signal is operated upon in a closed loop system by a series of filters. These filters are standard digital filters and provide sufficient bandwidth to control the position error without overshooting and effecting marginal stability conditions. The output of the filters is an error signal which is summed with the preprogrammed acceleration profile signal. The output of the filters is also operated upon by an adaptive process which is designed to compensate for fixed or slowly changing anomalies in the known parameters of the loop. The kinds of parameter errors that the adaptive process corrects are such things as errors in the acceleration feed-forward gain, friction effects, temperature effects on the analog components, etc. The function of the adaptive process is then to build and store additive values of current command in a table, the entries corresponding to each bin of the scan command profile. These values are added to those generated by the compensation output from the filters and the acceleration feed-forward functions to finally control the motor.

BRIEF DESCRIPTION OF THE DRAWINGS

FIG. 1 is a block diagram showing the basic elements of a scanning system and the scene being scanned;

FIG. 2 is a block diagram of a scanner system in accordance with the present invention;

FIG. 3 is a more detailed block diagram of the architecture of a scanner in accordance with the present invention; and FIG. 4 is a schematic description of the operations provided in the microprocessor 51 wherein the input is from the ADC 49 and the output is to the DAC 53 as described with reference to FIG. 3.

DESCRIPTION OF THE PREFERRED EMBODIMENT

The purpose of the scanner is to scan a two-dimensional infrared scene. With reference to FIG. 1, the scanner includes a detector array 1, which is generally a one-dimensional array of IR detector elements, generally about 480 such elements. The scene 5 is detected by the detector elements of the detector array 1 via a scanning mirror 3 which traverses the scene of interest and reflects the received infrared radiations indicative of the observed scene onto the detector array. The mirror 3 then returns to its original start position and commences a new scan and retrace operation. The number of scans is generally at a rate of about 60 Hz, though this number is arbitrary and is often other than 60 Hz. The scene detected by the detector array is then reconstructed in standard manner, such as, for example, a visual display, via video processing 7. It is imperative that the scanning mirror 3 travel at a velocity corresponding to the sampling rate of the detector array 1, any deviation from that velocity being a performance loss.

Referring now to FIG. 2, there is shown a block diagram of a scanner system in accordance with the present invention which includes a scanner assembly 10 composed of a scan mirror 17, a DC motor 15 and a resolver control transformer 19 and control circuitry therefor. The scanner system includes a microcontroller 11 which controls a current driver 13 which provides drive current to a DC motor 15. The motor 15 controls the scanning of a scanning mirror 17 as well as a resolver control transformer 19 which senses the present position of the motor 15 and the mirror 17. The microcontroller 11 also provides a position command signal indicative of the desired (or required) position of the mirror 17 into a position command generator 21. The position command generator 21 provides this position by providing appropriate sine and cosine signals to the resolver 19, the latter providing an error signal to a position error processing circuit 23 indicative of the difference between the position command signal and the present position as determined by the resolver. This error signal is sent back to the microcontroller 11 which, through its software and adaptive algorithms, adjusts the current driver 13.

The resolver 19, which is a position sensor, takes input signals representing the sine and cosine of the desired angle and outputs a signal representing the error from that position. The electromechanical equations describing the operation of the resolver, which, in the preferred embodiment is a 1-speed resolver, are:

Input:   $V(S2 - S4) = A\sin\phi = V_A * \sin(\omega t) * \sin\phi$
(stator) $V(S1 - S3) = A\cos\phi = V_A * \sin(\omega t) * \cos\phi$
{Sine and cosine commands}

Output:  $V(R1 - R3) = Tr * [V(S1 - S3) * \sin\Theta - V(S2 - S4) * \cos\Theta]$
(rotor)              $= Tr * V_A * \sin(\omega t) * \sin(\Theta - \phi)$
{Position error} where: $V_A$=magnitude of the carrier
$\omega$=frequency of the carrier (20 kHz * 2 * $\pi$)
Tr=transformation ratio of the resolver (gain)
$\phi$=desired angle for which the resolver error voltage is zero
$\Theta$=actual rotor angle with respect to stator.

While the above equations, per se, are well known, it should be noted that they are applied in a manner which is backward from that generally used.

Referring now to FIG. 3, which is a more detailed block diagram of the architecture of a scanner in accordance with the present invention, there is shown a resolver 31 which is a transformer having coils 33, 35 and 37 of which coil 37 is movable. As coil 37 moves, an error signal is provided in that coil. At all times, a microprocessor (shown as the line enclosing 39, 41 and 51) provides sine 39 and cosine 41 signals indicative of the desired position of the scanner and sends these signals to a 16 bit multiplying DAC (MDAC) 43. The MDAC multiplies each of the sine and cosine signals 39 and 41 by a reference sine wave received via low pass filter 45, which acts as a carrier to be modulated (such as, for example, A sin (20 kHz) and provides a modulated carrier sine wave and cosine wave as a result of the multiplication, the modulated sine wave exciting the coil 33 and the modulated cosine wave exciting the coil 35. The resolver 31 is wound so that coil 37, which is a secondary for the other coils 33 and 35 will produce the angular position error when excited by coils 33 and 35 as described. Normally, a single sine reference excites coil 37, the output being an angular position indicated by the sine and cosine of the angle on coils 33 and 35. Therefore the resolver is used backwards. The error signal which appears at coil 37 and is filtered in a bandpass filter 45 to improve the signal to noise ratio. The error signal is then demodulated in demodulator 47 to remove the carrier (e.g. 20 kHz) and provide a DC signal. The DC signal is converted to a digital signal in a 16 bit ADC 49, the digital signal being brought into a microprocessor 51 where it is worked on by the algorithms therein. The purpose of the algorithms is to determine from the error signal the amount of motor drive required to force the error to zero. A signal indicative of the amount of motor drive required is provided to a DAC 53 by the microprocessor 51 which then drives a current driver 55 which then drives the motor 57. The motor 57 then drives the load 59, which is the equivalent of the mirror and resolver, to a new position. As an alternative or in addition, an optical position sensor 61 for determining the position of the motor can be used to further stabilize the system performance over temperature in terms of angle drift or offset, this being fed back to the microprocessor to provide additional fine tuning.

Referring now to FIG. 4, there is shown a schematic description of the operations provided in the microprocessor 51 for a specific example which is provided by way of example and not by way of limitation wherein the input is from the ADC 49 and the output is to the DAC 53 as described with reference to FIG. 3. The output of the ADC 49, which is the loop position error, is filtered in a G4 filter 63 which is a first order lead-lag whose lead corner frequency is at 21 Hz and whose lag corner frequency could be, for example, at 2606.69 Hz. The s-domain structure of this filter is, for the specific example, which is provided by way of example and not of limitation:

$G4(s) = 329.78(s+132.113)/(s+1.637 \times 10^4)$.

The z-domain equivalent of the filter of this example is achieved by applying the bilinear transform in which the Laplace operator, s, is replaced by:

$s = (2/\tau)(1-z^{-1}/1+z^{-1})$ where $\tau$ is the scan loop sample period, 1.9960=100.4 $\mu$sec. This substitution results in the following z-domain transfer function:

$G4(z) = (4096(1458-144-z^{-1}))/32787-3207z^{-1}$.

The output of filter 63 is scaled by a scaler 65 and the output thereof is then filtered by a G4A filter 67 and then by a G8 filter 69.

The G4A filter 67 is a first order lead-lag whose lead corner frequency is 364.4 Hz and whose lag corner frequency is, for example, at 927.58 Hz. The s-domain structure of this filter is:

$$G4A(s)=2.027(s+2288.56)/(s+5825.18).$$

The z-domain equivalent of this filter is achieved by applying the bilinear transform as above, resulting in the following z-domain transfer function:

$$G4A(z)=(512(112-89z^{-1}))/32787+17996z^{-1}.$$

The G8 filter is a double "integral plus proportional" filter whose lead corners are, for example, 101.86 Hz. The s-domain structure of this filter is:

$$G8(s)=[6352.5(s^2+1.243g\times10^3+4.092\times10^5)]/s^2.$$

The z-domain equivalent of this filter is achieved by applying the bilinear transform as before, resulting in the following z-domain transfer function:

$$G8(z)=[(12718-24620z^{-1})+11928z^{-2}]/(1-2z^{-1}+z^{-2}).$$

The G4, G4A and G8 filters are standard digital filters and provide sufficient bandwidth to control the position error without overshooting and effecting marginal stability conditions.

The output of the filter 69 is sent to adaptive B filter 71 followed by adaptive bin memory 75 and adaptive A filter 79 with scalers 73, 77 and 81 between each of the adaptive algorithm blocks. The adaptive filters are the learning portion of the algorithm. They are the part of the algorithm that provides <one percent performance because the learning compensates for errors which would otherwise prevent the performance from reaching the <1 percent point. Accordingly, the G-filters drive the error toward zero.

The adaptive portion of the algorithm is designed to compensate for fixed or slowly changing anomalies in the known parameters of the loop. The kinds of parameter errors that the adaptive process corrects are such things as errors in the acceleration feed-forward gain, friction effects, temperature effects on the analog components, etc. The function of the adaptive process is then to build and store additive values of current command in a table, the entries corresponding to each bin of the scan command profile. These values are added to those generated by the compensation output from G8 filter 69 and the acceleration feed-forward functions. There is a table which depends upon the specific implementation or rate. For example, there can be one table for 60 Hz operation and another for 30 Hz operation, etc. Experience has shown that if the gain of the adaptive process is too high, instabilities can develop in the loop dynamics. In order to avoid this potential difficulty, the gain on the output of adaptive B filter 71 is adjusted as a function of run time after any state change of the scanner.

The adaptive process has three sections, these being a low pass filter to reduce the noise input to the process which is adaptive B filter 71, and adaptive bin memory 75 which is a table of registers containing values for each type of operation, there being 166 values for 60 Hz and 332 values for 30 Hz operation in the preferred embodiment, and an adaptive A filter 79 which forms a linear combination of three values found in three consecutive bins of the adaptive bin register.

The structure of the adaptive B filter 71 in the s-domain is:

$$ADAPT\ B(s)=1.63\times10^8/(s^2+39117s+3.78\times10^8)$$

and in the z-domain is:

$$ADAPT\ B(z)=(3405.4+6810.8z^{-1}+3405.4z^{-2})/(32787-543.2z^{-1}+97.36z^{-2}).$$

The values stored in the adaptive bin register 75 are the integrated values of the output of filter 71 for each of the loop update time intervals corresponding to the commanded scan profile. Each previous value for a given interval is updated by adding the new output of filter 71 for that interval on each successive scan. As the scans continue, these values converge to a constant or nearly constant value. The function of the adaptive process is to drive the output of the G8 filter 69 to zero, thus implying zero loop error.

With reference to adaptive A filter 79, experience has shown that the group of bins from which the output is formed must be advanced with respect to the actual bin number associated with the scan command profile in order to achieve acceptable performance. This advance imposes lead on the output which has been found to be necessary to achieving the desired performance. The system will commence operation with some predetermined advance and adjust the advance thereafter on the basis of test results. The structure of the adaptive A filter 79 in the s-domain is:

$$ADAPT\ A(s)=1.25\times10^7/(s^2+20955s+2.16\times10^8)$$

and in the z-domain is:

$$ADAPT\ A(z)=(395.7+791.42z^{-1}+395.7z^{-2})/(32768-11649z^{-1}+6233z^{-2}).$$

The output of the G8 filter 69 is also applied to a summing circuit 85 via a scaler 83, this output being the torque command required to correct the loop position error in the system. Also summed in the summer 85 only during the retrace portion of the scanning operation is an acceleration feed-forward signal provided by an acceleration feed-forward profile 87 which is scaled by scaler 89. The correction provided by summer 85 is summed in the summer 91 with the adaptive correction provided by the adaptive circuitry to provide the output signal to the DAC 53 for controlling the motor 15. It can be seen that the standard closed loop control is provided to summer 85 and, in addition, a learning signal is provided in summer 91. Also, there is the acceleration command from processes 87, 89, which is an open loop input and assists the loop in meeting the retrace acceleration requirements. The implementation of this function is actually accomplished by precomputing a table of equivalent current command values. This is the current command required to obtain the acceleration required to perfectly execute the retrace scan profile. This computation is based on an a priori knowledge of the DAC gain, the current driver gain, the motor torque constant and the load inertia.

It can be seen that the acceleration command is calculated in advance and loaded as a pre-existing table of values. It is defined by an equation which is specific to the project using the scanner and, based upon the actual position of the scanner. A correction factor is provided for that error which goes to summer 85. Accordingly, the output of summer 85 is the predicted current plus a correction factor. The correction factor is further processed by the adaptive process to further correct the error signal, this further corrected error signal being summed in summer 91 with the output of summer 85. A correction is being made at every measured point in each scan in accordance with the present invention, this involving many tens and possibly hundreds of points during each scan as opposed to a single correction or just a few overall corrections as provided by the prior art. The result is a much greater degree of linearity, repeatability and efficiency as compared with prior art scanners.

Though the invention has been described with reference to a specific preferred embodiment thereof, many variations and modifications will immediately become apparent to those skilled in the art. It is therefore the intention that the appended claims be interpreted as broadly as possible in view of the prior art to include all such variations and modification.

We claim:

1. A scanner which comprises:
   a motor for driving a load;
   means for providing a position error signal representing a difference between a predicted position of said load and an actual position of said load; and
   driving means for driving said motor in response to said position error signal;
   wherein said means for providing a position error signal includes a closed loop filter system for filtering said error signal to provide a filtered error signal, an adaptive filter system for operating on said filtered error signal to provide an adaptively filtered error signal, and summing means for summing signals indicative of said predicted position, said filtered error signal and said adaptively filtered error signal.

2. The scanner of claim 1, wherein said load is a mirror scanning a scene.

3. The scanner of claim 2 wherein said means for providing a position error signal provides said position error signal plural times during a single scanning of said scene.

4. The scanner of claim 1 wherein said closed loop filter system includes, in series, at least one first order lead lag filter and a double integral plus proportional filter.

5. The scanner of claim 4 wherein said adaptive filter system includes, in series, a low pass filter, a register and an integrator.

6. The scanner of claim 1 wherein said adaptive filter system includes, in series, a low pass filter, a register and an integrator.

7. A scanner which comprises:
   a motor for driving a load;
   means for providing a position error signal representing a difference between a predicted position of said load and an actual position of said load; and
   driving means for driving said motor in response to said position error signal;
   wherein said load is a mirror scanning a scene; and
   wherein said means for providing a position error signal includes a closed loop filter system for filtering said error signal to provide a filtered error signal, an adaptive filter system for operating on said filtered error signal to provide an adaptively filtered error signal, and summing means for summing signals indicative of said predicted position, said filtered error signal and said adaptively filtered error signal.

8. The scanner of claim 7 wherein said closed loop filter system includes, in series, at least one first order lead lag filter and a double integral plus proportional filter.

9. The scanner of claim 8 wherein said adaptive filter system includes, in series, a low pass filter, a register and an integrator.

10. The scanner of claim 7 wherein said adaptive filter system includes, in series, a low pass filter, a register and an integrator.

11. A scanner which comprises:
    a motor for driving a load;
    means for providing a position error signal representing a difference between a predicted position of said load and an actual position of said load; and
    driving means for driving said motor in response to said position error signal;
    wherein said load is a mirror scanning a scene;
    wherein said means for providing a position error signal provides said position error signal plural times during a single scanning of said scene; and
    wherein said means for providing a position error signal includes a closed loop filter system for filtering said error signal to provide a filtered error signal, an adaptive filter system for operating on said filtered error signal to provide an adaptively filtered error signal, and summing means for summing signals indicative of said predicted position, said filtered error signal and said adaptively filtered error signal.

12. The scanner of claim 11 wherein said closed loop filter system includes, in series, at least one first order lead lag filter and a double integral plus proportional filter.

13. The scanner of claim 12 wherein said adaptive filter system includes, in series, a low pass filter, a register and an integrator.

14. The scanner of claim 11 wherein said adaptive filter system includes, in series, a low pass filter, a register and an integrator.

15. A scanner which comprises:
    a motor for repeatedly driving a load across a predetermined path;
    means for providing a position error signal representing a difference between a predicted position of said load and an actual position of said load plural times during each single driving of said load across said predetermined path; and
    driving means for driving said motor in response to said position error signal;
    wherein said means for providing a position error signal includes a closed loop filter system for filtering said error signal to provide a filtered error signal, an adaptive filter system for operating on said filtered error signal to provide an adaptively filtered error signal, and summing means for summing signals indicative of said predicted position, said filtered error signal and said adaptively filtered error signal.

16. The scanner of claim 15, wherein said load is a mirror scanning a scene.

17. The scanner of claim 15 wherein said closed loop filter system includes, in series, at least one first order lead lag filter and a double integral plus proportional filter.

18. The scanner of claim 17 wherein said adaptive filter system includes, in series, a low pass filter, a register and an integrator.

19. The scanner of claim 15 wherein said adaptive filter system includes, in series, a low pass filter, a register and an integrator.

20. A scanner which comprises:
    a motor for repeatedly driving a load across a predetermined path;
    means for providing a position error signal representing a difference between a predicted position of said load and an actual position of said load plural times during each single driving of said load across said predetermined path; and driving means for driving said motor in response to said position error signal;

wherein said load is a mirror scanning a scene; and wherein said means for providing a position error signal includes a closed loop filter system for filtering said error signal to provide a filtered error signal, an adaptive filter system for operating on said filtered error signal to provide an adaptively filtered error signal, and summing means for summing signals indicative of said predicted position, said filtered error signal and said adaptively filtered error signal.

21. The scanner of claim 20 wherein said closed loop filter system includes, in series, at least one first order lead lag filter and a double integral plus proportional filter.

22. The scanner of claim 21 wherein said adaptive filter system includes, in series, a low pass filter, a register and an integrator.

23. The scanner of claim 20 wherein said adaptive filter system includes, in series, a low pass filter, a register and an integrator.

24. A scanner, comprising:

a motor for driving a load;

a control portion operative to control said motor, and operative to generate first and second signals representative of a desired position of the load; and a resolver control transformer having first and second stationary coils and having a movable third coil, said motor being drivingly coupled to said third coil for effecting movement thereof, the first and second signals being respectively applied to said first and second coils, and said third coil generating a feedback signal;

said control portion being responsive to the feedback signal and being operative to effect the control of said motor in the form of feedback control based on the feedback signal.

25. The scanner of claim 24, wherein the feedback signal represents a difference between a desired position and an actual position of the load.

26. The scanner of claim 24, wherein the first signal is a sine signal and the second signal is a cosine signal.

27. The scanner of claim 24, wherein the first and second signals each include a carrier component having a predetermined frequency;

wherein the feedback signal includes the carrier component at the predetermined frequency; and wherein said control portion is operative to remove the carrier component from the feedback signal.

28. The scanner of claim 24, including a detector which operative to detect radiation, and wherein the load includes a mirror which reflects radiation onto the detector.

29. A scanner, comprising:

a detector operative to detect radiation;

a mirror;

a motor drivingly coupled to said mirror for effecting scanning movement of said mirror in a manner causing radiation to be reflected onto said detector;

a control portion operative to control said motor, and operative to output desired position information representative of a desired position of the mirror; and an error determining portion responsive to the desired position information and operative to generate feedback error information representing a difference between an actual position of said mirror and a desired position of said mirror;

said control portion including an adaptive portion which is responsive to the feedback control information, and which is operative to adaptively generate compensation information based on the feedback control information, said control circuit using the compensation information to effect feedback control of said motor.

30. The scanner of claim 29, wherein said control portion includes a closed loop filter portion which is operative to filter the feedback control information to provide filtered feedback information;

wherein said adaptive portion is operative to adaptively filter the filtered feedback information to provide adaptively filtered information; and wherein said control portion includes a further portion which combines the filtered feedback information, the adaptively filtered information, and the desired position information.

31. The scanner of claim 29, wherein said control portion is operative to output the desired position information in the form of first and second signals; wherein said error determining portion includes a resolver control transformer having first and second stationary coils and having a movable third coil, said motor being drivingly coupled to said third coil for effecting movement thereof, the first and second signals being respectively applied to said first and second coils, and said third coil generating a feedback signal which is supplied to said control portion and which includes said feedback error information.

* * * * *

UNITED STATES PATENT AND TRADEMARK OFFICE
CERTIFICATE OF CORRECTION

PATENT NO. : 5,869,945
DATED : February 9, 1999
INVENTOR(S) : Ha et al.

It is certified that error appears in the above-identified patent and that said Letters Patent is hereby corrected as shown below:

Column 4, line 62, delete "$s=(2/\tau)(1-z^{-1}/1+z^{-1})$"
and insert -- $s = (2/\tau)(1 - z^{-1}/1 + z^{-1})$ --.

Signed and Sealed this

Seventh Day of September, 1999

Attest:

Q. TODD DICKINSON

Attesting Officer     Acting Commissioner of Patents and Trademarks